(12) United States Patent
Fuller

(10) Patent No.: US 8,544,345 B2
(45) Date of Patent: Oct. 1, 2013

(54) POSITIVE DISPLACEMENT FLOW METER

(76) Inventor: Wayne Frederick Fuller, Caringbah (AU)

(*) Notice: Subject to any disclaimer, the term of this patent is extended or adjusted under 35 U.S.C. 154(b) by 57 days.

(21) Appl. No.: 13/199,480

(22) Filed: Aug. 31, 2011

(65) Prior Publication Data

US 2013/0047744 A1 Feb. 28, 2013

(51) Int. Cl.
*G01F 15/00* (2006.01)

(52) U.S. Cl.
USPC ........................................... 73/861.77

(58) Field of Classification Search
USPC ............ 73/761.261, 861.77, 861.75, 861.79
See application file for complete search history.

(56) References Cited

U.S. PATENT DOCUMENTS 5,184,519 A * 2/1993 Ciarelli et al. ............. 73/861.77
5,627,313 A * 5/1997 Gomez et al. .................. 73/261

OTHER PUBLICATIONS

Luker 2013/0025365, Jul. 27, 2011.*

* cited by examiner

*Primary Examiner* — Jewel V Thompson
(74) *Attorney, Agent, or Firm* — Thomas N. Phung; Jacobsen and Johnson

(57) ABSTRACT

There is a positive displacement flowmeter, which includes at least two primary measuring elements rotatable on respective spaced apart axes within a housing between a fluid inlet and a fluid outlet. The elements are linked to rotate in accordance with volumetric flow through the flowmeter from said inlet to said outlet. There are at least two opposed pole magnets disposed at separated positions on one of the elements and a pole sensitive sensor located in a rotational path of said magnets whereby said sensor is adapted to emit an output signal upon activation by said at least two of said opposed pole magnets.

8 Claims, 2 Drawing Sheets

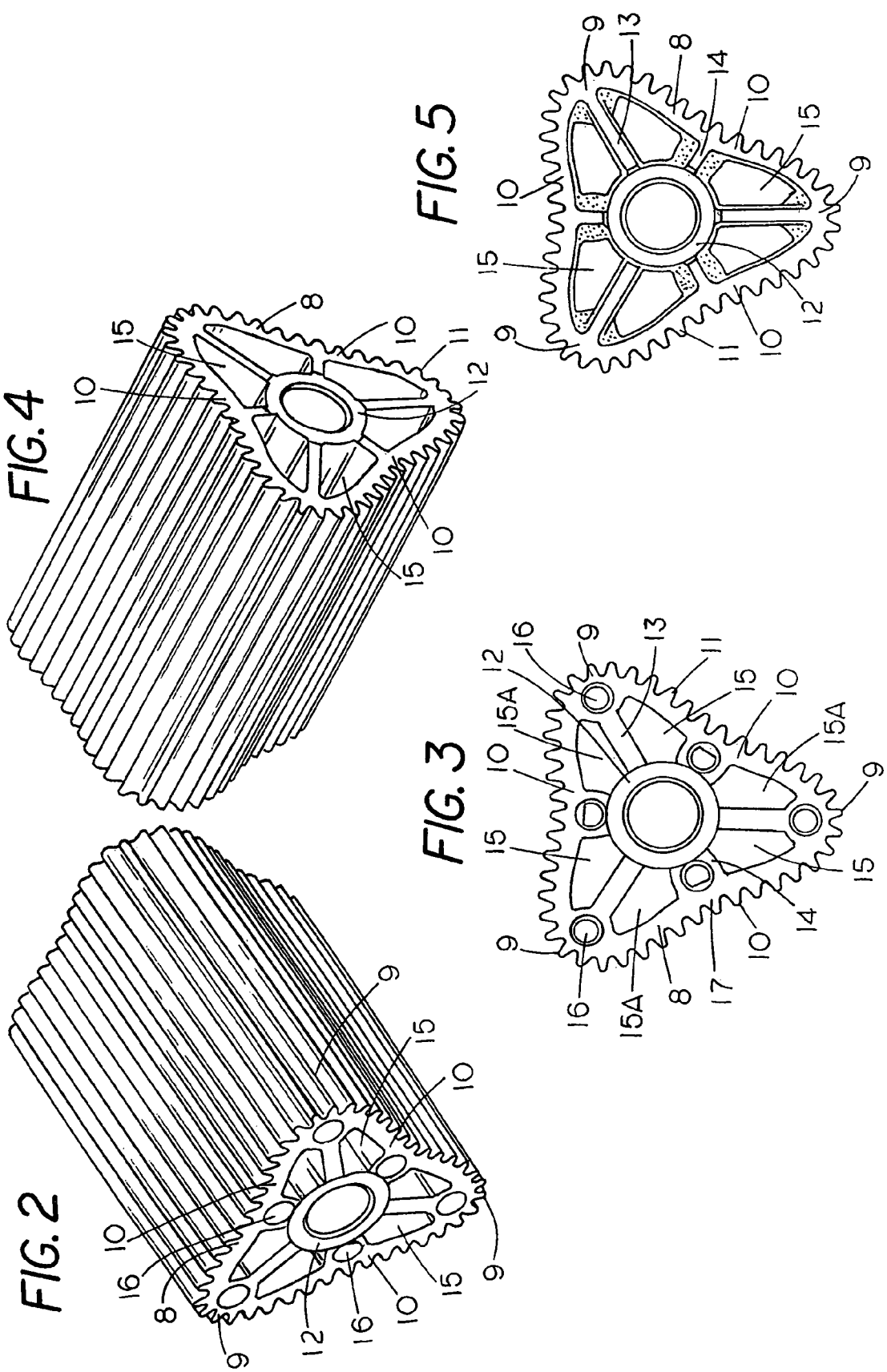

POSITIVE DISPLACEMENT FLOW METER

FIELD OF THE INVENTION

This invention relates to apparatus for flow measurement. More particularly, although not exclusively it discloses improvements to positive displacement flowmeters to achieve improved electrical signal generation.

BACKGROUND OF THE INVENTION

Positive displacement flowmeters typically include oval rotor, rotary vane and gear wheel flowmeters. Oval rotor flowmeters for example comprise a pair of oval shaped rotors as the primary measuring elements. With those meters having direct pulse generation magnets are fitted to the rotors. These rotors rotate in accordance with fluid flow passing through the meter. One or more fixed sensors or signal generating means such as reed switches, hall effect devices, coils or proximity switches etc. are excited to generate an electrical pulse each time one of the rotor mounted magnets passes. An output train or series of such pulses is necessary for the purpose of flow rate integration and calculation.

One disadvantage with such prior art flowmeters is that transient flow reversals adversely affect the quality and point accuracy of the flowmeter output. Such flow reversals occur for example in internal combustion engine fuel supply systems and pulsating flow lines. They can cause substantial inaccuracies in the measurement of fluid flow in the forward direction. More specifically, with prior art devices such as that shown schematically in FIG. 1, magnets 1 are mounted on respective lobes 2 of rotors 3. As the rotors rotate these magnets each pass a single fixed sensor 4, which is thereby activated to generate one pulse. After the magnetic field from each magnet passes out of the sensor activation zone the sensor automatically resets itself for the next pass. If at any time during this process the fluid flow direction and rotor rotation briefly reverses, the last activating magnet after leaving can re-enter the sensor activation zone to cause generation of an additional aberrant pulse. This can produce a point error of as much as 50% to 100%. This condition can apply to a magnet either approaching or leaving the sensor activation zone. Generally the greater the order of reverse flow the larger is the potential for erroneous pulses. These pulses result in inconsistent and inaccurate readings being transmitted to the receiving instrument.

SUMMARY OF THE INVENTION

It is therefore an object of this invention to ameliorate the aforementioned disadvantage and accordingly a positive displacement flowmeter is disclosed which includes at least two primary measuring elements rotatable on respective spaced apart axes within a housing between a fluid inlet and a fluid outlet, said elements being linked to rotate in accordance with volumetric flow through the flowmeter from said inlet to said outlet, at least two opposed pole magnets disposed at separated positions on one of the elements and a pole sensitive sensor located in a rotational path of said magnets whereby said sensor is adapted to emit an output signal only upon activation by said at least two of said opposed pole magnets.

Preferably said opposed pole magnets are positioned at about 180 degrees apart on one of said elements.

It is further preferred that said pole sensitive sensor is a bi-polar hall effect device or other pole sensitive status latching sensor.

It is further preferred that primary measuring elements are rotors and said opposed pole magnets are disposed on opposite lobes of one of said rotors.

BRIEF DESCRIPTION OF THE DRAWING

FIG. 3 shows an elevated end view of the flowmeter gear rotor of FIG. 2;
FIG. 4 shows a perspective view of the gear rotor of FIGS. 2 and 3 from the opposite end;
and
FIG. 5 shows an elevated end view of the gear rotor of FIG. 4.

DESCRIPTION OF THE PREFERRED EMBODIMENT

Figure 1:
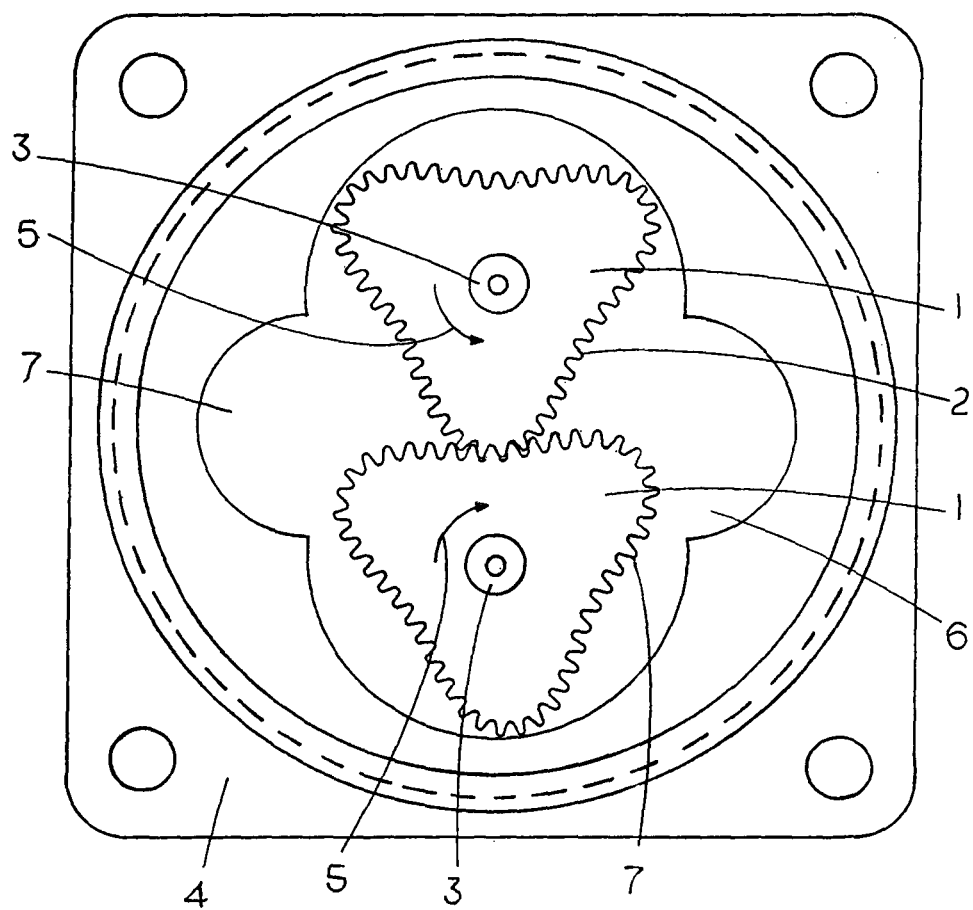
FIG. 1 is a schematic drawing of an end view of a positive displacement flowmeter.
Figure 1:
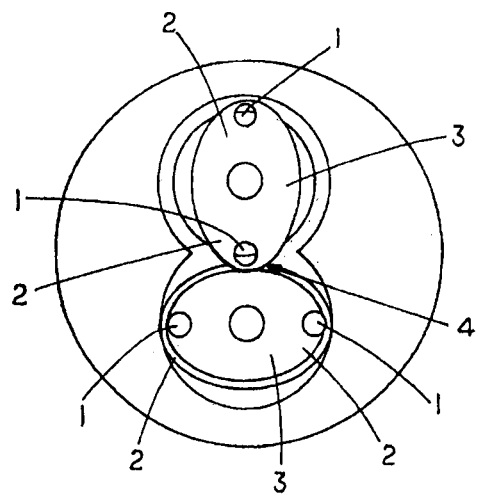

There is a flowmeter housing 5 from which the cover (not shown) has been removed to show a pair of oval rotors 6, 7 within an operating chamber 8. The rotors are offset by 90 degrees as shown and meshed together to rotate around spaced apart parallel axis 9, 10 in directions indicated for example by arrows 11, 12 as fluid passes through the meter. In accordance with the invention there is a pole sensitive status latching sensor such as a bi-polar hall effect device 13 fixed in the housing closely adjacent the rotational path of the rotor lobes 14, 15. These lobes have opposed pole magnets 16, 17 mounted in them, which upon rotor rotation alternately pass their facing north and south magnetic poles closely over the sensor. The sensor is of a type to adopt a first electrical state upon the passing of one magnetic pole and retain that state until the other opposite pole passes whereby it adopts a second electrical state to emit an output pulse. The effect of this novel arrangement is that the rotational operating window required for the sensor pulse generation is substantially increased to the extent that typical transient flow reversals and associated rotor reversals are not registered by the meter. Forward flow measurement of the meter is thus not compromised by transient flow reversals as with prior art meters.

It will thus be appreciated that this invention at least in the form of the embodiment disclosed provides a novel and useful improvement in the construction of positive displacement flowmeters. Clearly however the example described is only the currently preferred form of the invention and a wide variety of modifications may be made which would be apparent to a person skilled in the art. For example the shape, configuration and number of rotors, the placement of the magnets and the type and positioning of the sensor may change following further development work by the inventors.

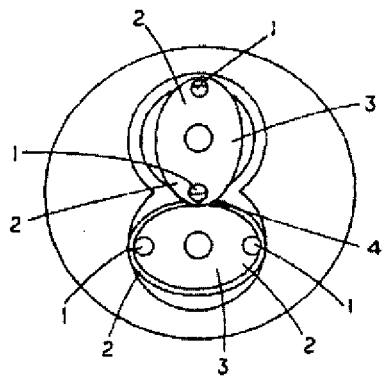

The invention claimed is:

1. A positive displacement flowmeter including at least two primary measuring elements rotatable on respective spaced apart axes within a housing between a fluid inlet and a fluid outlet, said elements being linked to rotate in accordance with volumetric flow through the flowmeter from said inlet to said outlet, at least two opposed pole magnets disposed at respective separated magnet positions on one or more of the elements and a pole sensitive sensor located closely adjacent a rotational path of said magnet positions wherein said pole sensitive sensor is of a type to adopt a first electrical state upon passing of one of said at least two opposed pole magnets and retain said first electrical state until another of said at least two opposed pole magnets passes whereby said sensor adopts a second electrical state to emit an output signal.

2. The positive displacement flowmeter as claimed in claim 1 wherein said at least two of said opposed pole magnets are positioned at about 180 degrees apart on said one or more of the elements.

3. The positive displacement flowmeter as claimed in claim 1 wherein said pole sensitive sensor is a pole sensitive latching sensor.

4. The positive displacement flowmeter as claimed in claim 3 wherein said pole sensitive latching sensor is a bi-polar hall effect device.

5. The positive displacement flowmeter as claimed in claim 1 wherein said primary measuring elements are oval rotors with rotor lobes.

6. The positive displacement flowmeter as claimed in claim 5 wherein said rotors are offset by 90 degrees and are meshed together to rotate around said spaced apart axes.

7. The positive displacement flowmeter as claimed in claim 6 wherein said opposed pole magnets are disposed one each on respective ones of said rotor lobes.

8. The positive displacement flowmeter as claimed in claim 1 wherein said pole sensitive sensor is fixed to said housing.

\* \* \* \* \*

UNITED STATES PATENT AND TRADEMARK OFFICE
CERTIFICATE OF CORRECTION

| | | |
|---|---|---|
| PATENT NO. | : 8,544,345 B2 | |
| APPLICATION NO. | : 13/199480 | |
| DATED | : October 1, 2013 | |
| INVENTOR(S) | : Wayne Frederick Fuller | |

It is certified that error appears in the above-identified patent and that said Letters Patent is hereby corrected as shown below:

The title page showing the illustrative figure should be deleted to be replaced with the attached title page.

On the title page under item (57), last line of the abstract change "8 Claims, 2 Drawing Sheets" to read -- 8 Claims, 1 Drawing Sheet --

In the Drawings

Figure 2:
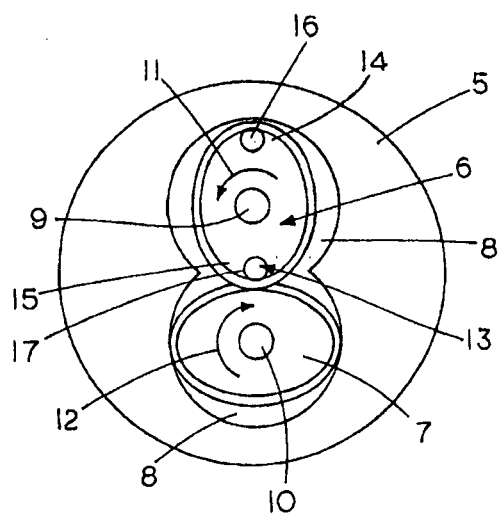
FIG. 2 shows a perspective view of a flowmeter gear rotor according to said invention from one end.
Figure 1:
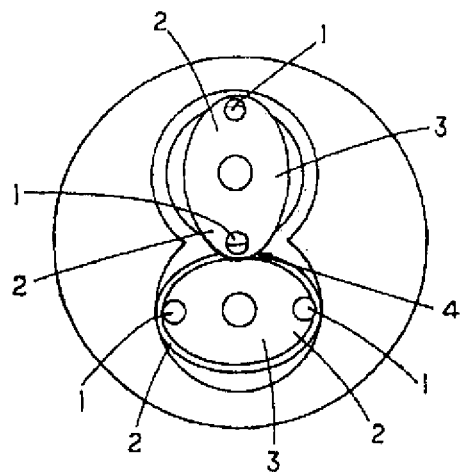
Figure 2:
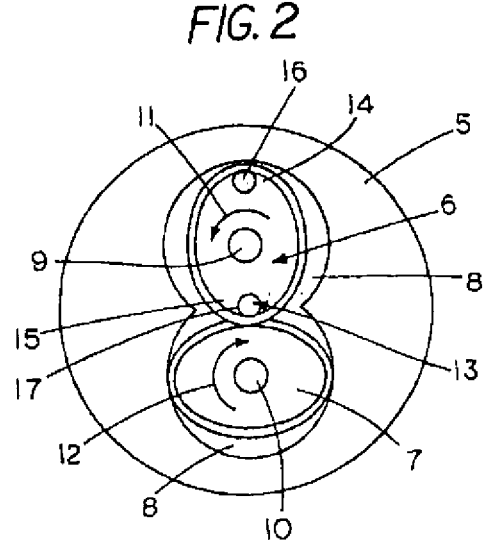

In the drawing sheets, consisting of Figs. 1, 2, 3, 4 and 5, should be deleted to be replaced with the drawing sheet, consisting of Figs. 1 and 2 as shown on the attached pages.

In the Specification

Column 2, lines 7-15 should be replaced with:

"One currently preferred embodiment of the invention will now be described with reference to the attached figure 2 which shows a schematic cross-sectional view of a flowmeter constructed in accordance with said invention."

Signed and Sealed this
First Day of July, 2014

Michelle K. Lee
*Deputy Director of the United States Patent and Trademark Office*

(12) United States Patent
Fuller

(10) Patent No.: US 8,544,345 B2
(45) Date of Patent: Oct. 1, 2013

(54) POSITIVE DISPLACEMENT FLOW METER

(76) Inventor: Wayne Frederick Fuller, Caringbah (AU)

( * ) Notice: Subject to any disclaimer, the term of this patent is extended or adjusted under 35 U.S.C. 154(b) by 57 days.

(21) Appl. No.: 13/199,480

(22) Filed: Aug. 31, 2011

(65) Prior Publication Data
US 2013/0047744 A1    Feb. 28, 2013

(51) Int. Cl.
*G01F 15/00* (2006.01)
(52) U.S. Cl.
USPC ................................................. 73/861.77
(58) Field of Classification Search
USPC ............. 73/761.261, 861.77, 861.75, 861.79
See application file for complete search history.

(56) References Cited

U.S. PATENT DOCUMENTS
5,184,519 A * 2/1993 Ciarelli et al. ............. 73/861.77
5,627,313 A * 5/1997 Gomez et al. ............. 73/261

OTHER PUBLICATIONS

Luker 2013/0025365, Jul. 27, 2011.*

* cited by examiner

*Primary Examiner* — Jewel V Thompson
(74) *Attorney, Agent, or Firm* — Thomas N. Phung; Jacobsen and Johnson

(57) ABSTRACT

There is a positive displacement flowmeter, which includes at least two primary measuring elements rotatable on respective spaced apart axes within a housing between a fluid inlet and a fluid outlet. The elements are linked to rotate in accordance with volumetric flow through the flowmeter from said inlet to said outlet. There are at least two opposed pole magnets disposed at separated positions on one of the elements and a pole sensitive sensor located in a rotational path of said magnets whereby said sensor is adapted to emit an output signal upon activation by said at least two of said opposed pole magnets.

8 Claims, 2 Drawing Sheets

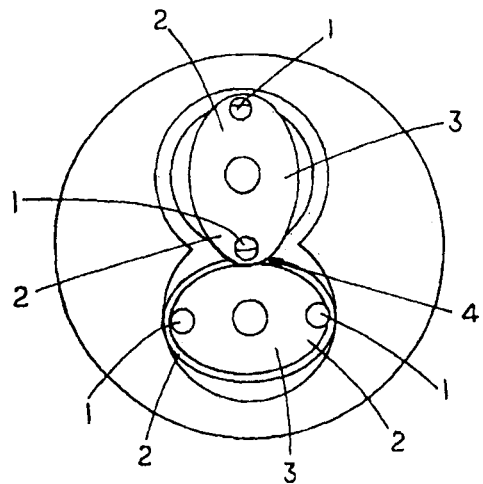

FIG. 1 (PRIOR ART)

UNITED STATES PATENT AND TRADEMARK OFFICE
CERTIFICATE OF CORRECTION

| | | |
|---|---|---|
| PATENT NO. | : 8,544,345 B2 | |
| APPLICATION NO. | : 13/199480 | |
| DATED | : October 1, 2013 | |
| INVENTOR(S) | : Wayne Frederick Fuller | |

It is certified that error appears in the above-identified patent and that said Letters Patent is hereby corrected as shown below:

The title page showing the illustrative figure should be deleted to be replaced with the attached title page.

On the title page under item (57), last line of the abstract change "8 Claims, 2 Drawing Sheets" to read -- 8 Claims, 1 Drawing Sheet --

In the Drawings

In the drawing sheets, consisting of Figs. 1, 2, 3, 4 and 5, should be deleted to be replaced with the drawing sheet, consisting of Figs. 1 and 2 as shown on the attached pages.

In the Specification

Column 2, lines 7-15 should be replaced with:

"One currently preferred embodiment of the invention will now be described with reference to the attached figure 2 which shows a schematic cross-sectional view of a flowmeter constructed in accordance with said invention."

This certificate supersedes the Certificate of Correction issued July 1, 2014.

Signed and Sealed this
Twenty-ninth Day of July, 2014

Michelle K. Lee
*Deputy Director of the United States Patent and Trademark Office*

(12) United States Patent
Fuller

(10) Patent No.: US 8,544,345 B2
(45) Date of Patent: Oct. 1, 2013

(54) POSITIVE DISPLACEMENT FLOW METER

(76) Inventor: Wayne Frederick Fuller, Caringbah (AU)

(*) Notice: Subject to any disclaimer, the term of this patent is extended or adjusted under 35 U.S.C. 154(b) by 57 days.

(21) Appl. No.: 13/199,480

(22) Filed: Aug. 31, 2011

(65) Prior Publication Data
US 2013/0047744 A1 Feb. 28, 2013

(51) Int. Cl.
*G01F 15/00* (2006.01)
(52) U.S. Cl.
USPC .................................. 73/861.77
(58) Field of Classification Search
USPC ............ 73/761.261, 861.77, 861.75, 861.79
See application file for complete search history.

(56) References Cited

U.S. PATENT DOCUMENTS 5,184,519 A * 2/1993 Ciarelli et al. ............ 73/861.77
5,627,313 A * 5/1997 Gomez et al. ................ 73/261

OTHER PUBLICATIONS

Luker 2013/0025365, Jul. 27, 2011.*

* cited by examiner

*Primary Examiner* — Jewel V Thompson
(74) *Attorney, Agent, or Firm* — Thomas N. Phung; Jacobsen and Johnson

(57) ABSTRACT

There is a positive displacement flowmeter, which includes at least two primary measuring elements rotatable on respective spaced apart axes within a housing between a fluid inlet and a fluid outlet. The elements are linked to rotate in accordance with volumetric flow through the flowmeter from said inlet to said outlet. There are at least two opposed pole magnets disposed at separated positions on one of the elements and a pole sensitive sensor located in a rotational path of said magnets whereby said sensor is adapted to emit an output signal upon activation by said at least two of said opposed pole magnets.

8 Claims, 2 Drawing Sheets